US008070111B1

(12) United States Patent
Zeller

(10) Patent No.: US 8,070,111 B1
(45) Date of Patent: Dec. 6, 2011

(54) ELECTRICAL CORD CLEAT

(76) Inventor: Charles Zeller, Corpus Christi, TX (US)

( * ) Notice: Subject to any disclaimer, the term of this patent is extended or adjusted under 35 U.S.C. 154(b) by 0 days.

(21) Appl. No.: 12/783,654

(22) Filed: May 20, 2010

(51) Int. Cl.
*F16L 3/00* (2006.01)
(52) U.S. Cl. ............................................. 248/49; 248/65
(58) Field of Classification Search ............... 248/65, 248/68.1, 74.5, 49, 51, 52; 439/373, 501, 439/457, 458
See application file for complete search history.

(56) References Cited

U.S. PATENT DOCUMENTS

| 2,438,143 | A | | 3/1948 | Brown |
| 3,257,497 | A | | 6/1966 | Chase |
| 3,811,104 | A | * | 5/1974 | Caldwell ........................ 439/135 |
| 3,838,383 | A | * | 9/1974 | Wilbur et al. ................... 439/472 |
| 5,011,427 | A | | 4/1991 | Martin |
| D325,564 | S | | 4/1992 | Lemke |
| 5,547,390 | A | | 8/1996 | Laherty |
| 7,255,588 | B2 | | 8/2007 | Wilder |
| 7,712,709 | B2 | * | 5/2010 | Winchester ...................... 248/89 |
| 2004/0069920 | A1 | * | 4/2004 | W. Dirks ...................... 248/316.7 |
| 2005/0189453 | A1 | * | 9/2005 | DeGuevara ................... 248/68.1 |

* cited by examiner

*Primary Examiner* — Ramon Ramirez

(57) ABSTRACT

The electrical cord cleat is a simple cleat that attaches to a surface immediately adjacent an electrical outlet and of which provides a means to secure at least one electrical cord thereon. The electrical cord cleat prevents unwanted disconnection from or damage to the electrical outlet by securing a portion of the electrical cord(s) to the near vicinity of the electrical outlet. An alternative embodiment includes a hinge to enable the cleat to fold flat against the adjacent surface when not in use.

16 Claims, 4 Drawing Sheets

ELECTRICAL CORD CLEAT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of electrical cord organizers and accessories, more specifically, a cleat for securing an electrical cord adjacent an electrical outlet.

B. Discussion of the Prior Art

As will be discussed immediately below, no prior art discloses a cleat that is mounted to a surface adjacent an electrical outlet and wherein said cleat secures at least one electrical cord there about so as to prevent unwanted damage to the adjacent electrical outlet upon forces imparted onto said electrical cord(s).

The Wilder Patent (U.S. Pat. No. 7,255,588) discloses a faceplate for an electrical outlet that has a cord storage and retaining apparatus to prevent a cord from being disengaged inadvertently. However, the storage and retaining apparatus is that can tie a plurality of electrical cords independent of one another.

The Martin Patent (U.S. Pat. No. 5,011,427) discloses a protective device that attaches to the faceplate of an electrical outlet and will retain the electrical cord in the outlet, preventing it from being pulled out. Again, the protective device mounts onto the faceplate and is not a separated apparatus that can suppot a multitude of electrical cords from unwanted separation from an electrical outlet.

The Brown Patent (U.S. Pat. No. 2,438,143) discloses a cord retaining attachment for an electrical outlet that prevents the cord from being pulled out of the outlet by mistake. However, the attachment is secured to the faceplate of an electrical outlet and is not a separated apparatus that secures a plurality of electrical cords to an adjacent electrical outlet.

The Laherty Patent (U.S. Pat. No. 5,547,390) discloses a device for securing an electrical cord to an outlet to prevent the cord from being removed inadvertently. However, the device is screwed onto the center screw of the faceplate of the electrical outlet and not a separated apparatus that attaches to a surface adjacent the electrical outlet.

The Chase Patent (U.S. Pat. No. 3,257,497) discloses a device that attaches to the cover of an electrical outlet faceplate and allows the cord to be wrapped around it. However, the device is attached about the faceplate of the electrical outlet and not a separated apparatus that secures a plurality of electrical cords to the surface adjacent the electrical outlet.

The Lemke Patent (U.S. Pat. No. Des. 325,564) illustrates a design for a device that attaches to an outlet and will retain the cord and plug in the outlet, which is not depicted and attached to a surface adjacent the electrical outlet.

While the above-described devices fulfill their respective and particular objects and requirements, they do not describe a cleat that is mounted to a surface adjacent an electrical outlet and wherein said cleat secures at least one electrical cord there about so as to prevent unwanted damage to the adjacent electrical outlet upon forces imparted onto said electrical cord(s). In this regard, the electrical cord cleat departs from the conventional concepts and designs of the prior art.

SUMMARY OF THE INVENTION

The electrical cord cleat is a simple cleat that attaches to a surface immediately adjacent an electrical outlet and of which provides a means to secure at least one electrical cord thereon. The electrical cord cleat prevents unwanted disconnection from or damage to the electrical outlet by securing a portion of the electrical cord(s) to the near vicinity of the electrical outlet. An alternative embodiment includes a hinge to enable the cleat to fold flat against the adjacent surface when not in use.

It is an object of the invention to provide a cleat that mounts to a surface adjacent an electrical outlet so as to secure the electrical cord and to prevent unwanted disconnection from or damage to the electrical outlet.

A further object of the invention is to provide a cleat that can secure at least one if not a plurality of electrical cords.

A further object of the invention is to provide an alternative embodiment that includes a hinge to enable the cleat tying surface to fold flat with the adjacent surface when not in use.

These together with additional objects, features and advantages of the electrical cord cleat will be readily apparent to those of ordinary skill in the art upon reading the following detailed description of presently preferred, but nonetheless illustrative, embodiments of the electrical cord cleat when taken in conjunction with the accompanying drawings.

In this respect, before explaining the current embodiments of the electrical cord cleat in detail, it is to be understood that the electrical cord cleat is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the electrical cord cleat.

It is therefore important that the claims be regarded as including such equivalent construction insofar as they do not depart from the spirit and scope of the electrical cord cleat. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
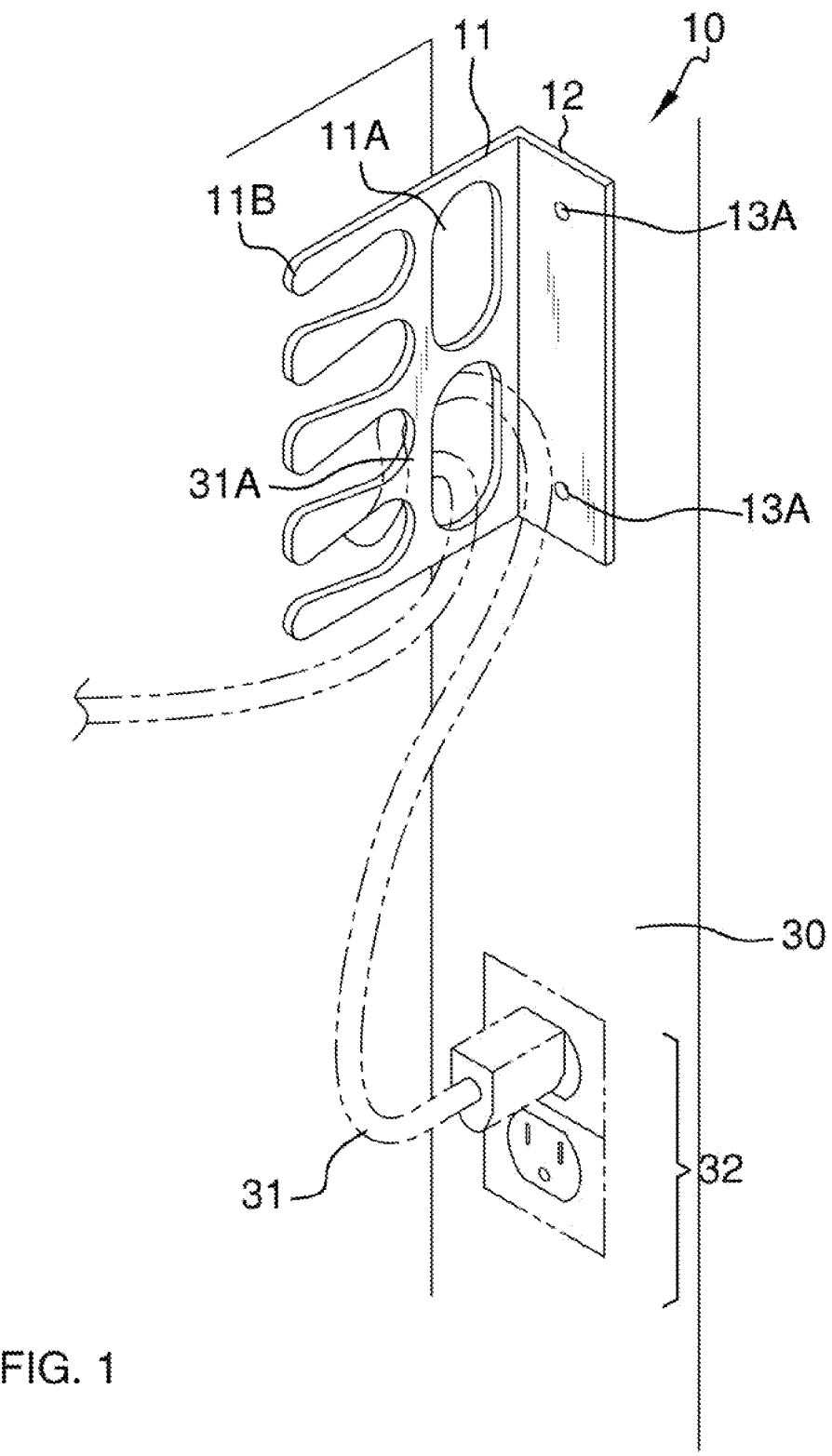
FIG. 1 illustrates a view of the electrical cord cleat attached adjacent an electrical outlet and with an electrical cord wrapped thereon and with said electrical cord plugged into said electrical outlet.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-4. An electrical cord cleat 10 (hereinafter invention) includes a cleat tying surface 11 and a mounting surface 12.

Generally, the cleat tying surface 11 is perpendicular with the mounting surface 12. However, an alternative embodiment 50 includes a hinge 15 that enables the cleat tying surface 11 to fold flat against the mounting surface 12 or to fold flat against an adjacent surface 30. It shall be noted that the hinge 15 may be of the continuous or piano ilk, which is different from a standard hinge in that continuous hinge runs the entire length of the invention 10.

The cleat tying surface 11 has a plurality of holes 11A and a plurality of fingers 11B. The cleat tying surface 11 is responsible for securing a portion of an electrical cord 31 to the invention 10, and in relative proximity with an electrical outlet 32 so as to prevent unwanted disconnection from or damage to said electrical outlet 32.

The mounting surface 12 and the cleat tying surface 11 of the invention 10 shall be made of materials comprising plastic, wood, carbon fiber composite, or metal.

Figure 2:
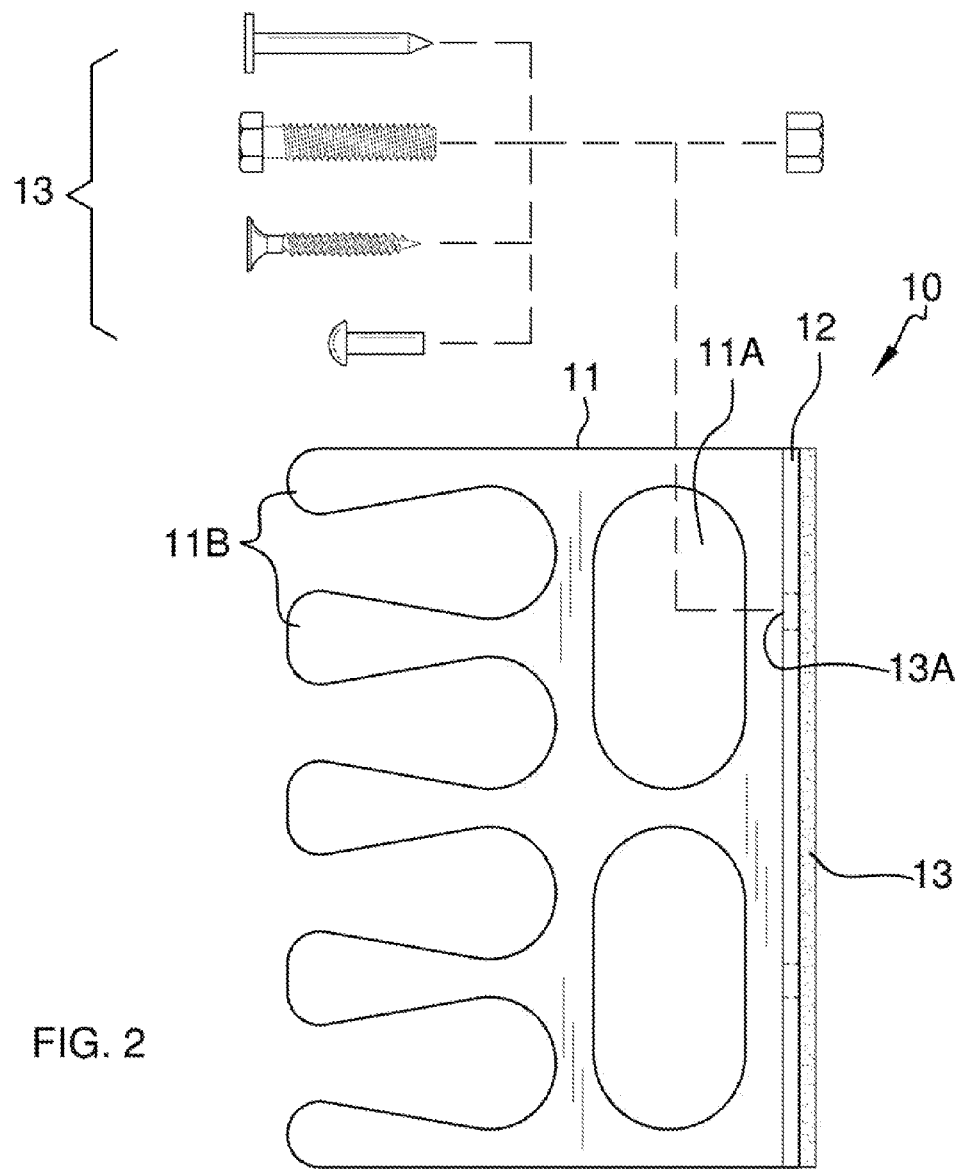
FIG. 2 illustrates a side view of the electrical cord cleat by itself and detailing the holes and fingers upon which an electrical cord is wrapped in order to be secured to said cleat, and further detailing the various mounting means employed to secure the invention to a mounting surface, and comprising a nail, a nut and bolt, a screw, a rivet, and a layer of adhesive located on the mounting surface.
Figure 3:
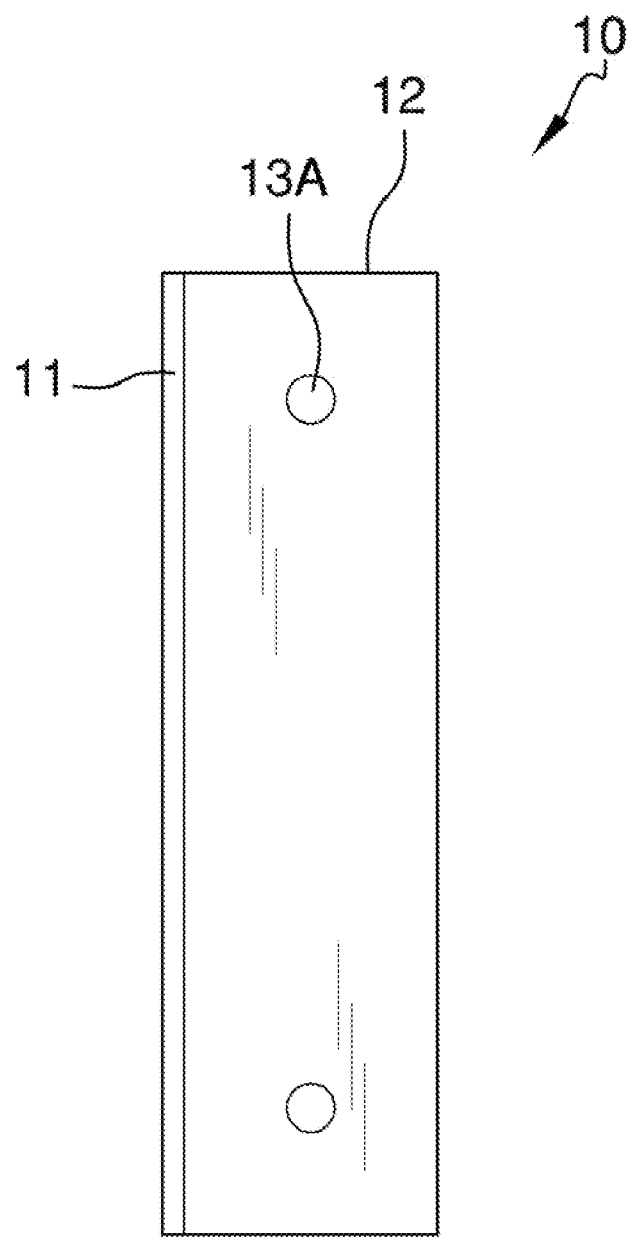
FIG. 3 illustrates a front view of the electrical cord cleat by itself.
Figure 4:
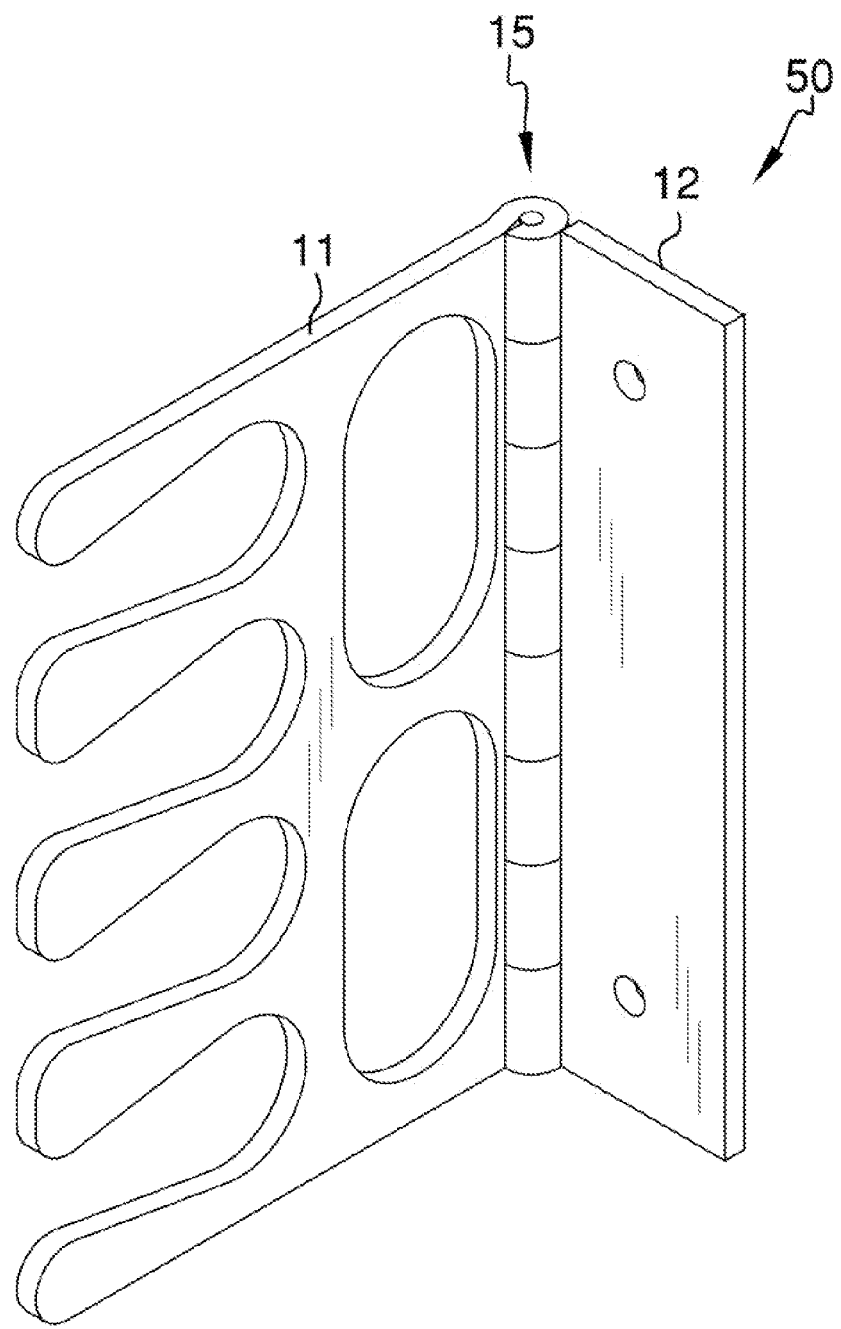
FIG. 4 illustrates an isometric view of an alternative embodiment of the electrical cord cleat by itself, and wherein said alternative embodiment features a hinge that enables the mounting side to rotate with respect to the side containing the fingers and holes.

The mounting surface 12 is secured to the adjacent surface 30 via a mounting means 13 comprising nails, rivets, screws, nut-bolt combinations, welding, and adhesive (see FIG. 2). The invention 10 depicts mounting holes 13A, which are useful in securing the invention 10 to the adjacent surface 30 via nails, rivets, screws, or nut-bolt combinations.

The cleat tying surface 11 secures the electrical cord(s) 31 to the invention 10 by presenting a half-loop 31A in the electrical cord 31 through one of the holes 11A, and then subsequently wrapping said half-loop around one of the fingers 11B.

With respect to the above description, it is to be realized that the optimum dimensional relationship for the various components of the invention 10 and the alternative embodiment 50, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10 and the alternative embodiment 50.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An electrical cord cleat comprising:
   a cleat typing surface that mounts onto a surface adjacent or in the vicinity of an electrical outlet;
   wherein the cleat tying surface enables at least one electrical cord to be secured to said cleat;
   wherein said cleat prevents unwanted disconnection from or damage to said electrical outlet by said electrical cord;
   wherein said cleat tying surface comprises a plurality of holes and a plurality of fingers; wherein said holes are positioned between said fingers and the adjacent surface;
   wherein said holes are not in communication with said fingers;
   wherein presenting a half-loop of said electrical cord through one of the holes, and then subsequently wrapping said half-loop around one of the fingers secures said electrical cord to the cleat tying surface.

2. The electrical cord cleat as described in claim 1 wherein said cleat mounts to said surface via a mounting means comprising nails, screws, bolts and nuts, welding, adhesive, or rivets.

3. The electrical cord cleat as described in claim 1 wherein said cleat is made of a material comprising a metal, plastic, wood, or carbon fiber composite.

4. The electrical cord cleat as described in claim 1 wherein said cleat includes a hinge located between the cleat tying surface and a mounting surface; wherein said hinge enables said cleat tying surface to fold flat against said adjacent surface when not in use.

5. The electrical cord cleat as described in claim 4 wherein said hinge is a continuous hinge that runs an entire length between the cleat tying surface and the mounting surface.

6. An electrical cord cleat comprising:
   a cleat typing surface that is perpendicular a mounting surface;
   wherein said mounting surface mounts onto a surface adjacent an electrical outlet;
   wherein the cleat tying surface enables at least one electrical cord to be secured to said cleat;
   wherein said cleat prevents unwanted disconnection from or damage to said electrical outlet by said electrical cord;
   wherein said cleat tying surface comprises a plurality of holes and a plurality of fingers;
   wherein said holes are positioned between said fingers and the adjacent surface;
   wherein said holes are not in communication with said fingers.

7. The electrical cord cleat as described in claim 6 wherein said mounting surface mounts to said adjacent surface via a mounting means comprising nails, screws, bolts and nuts, welding, adhesive, or rivets.

8. The electrical cord cleat as described in claim 6 wherein said cleat tying surface and said mounting surface are made of a material comprising a metal, plastic, wood, or carbon fiber composite.

9. The electrical cord cleat as described in claim 7 wherein at least one electrical cord is attached to the cleat tying surface via a half loop that is inserted through one of the holes and is wrapped around one of said fingers.

10. The electrical cord cleat as described in claim 6 wherein said cleat includes a hinge located between the cleat tying surface and said mounting surface; wherein said hinge enables said cleat tying surface to fold flat against said mounting surface when not in use.

11. The electrical cord cleat as described in claim 10 wherein said hinge is a continuous hinge that runs an entire length between the cleat tying surface and the mounting surface.

12. An electrical cord cleat comprising:
- a cleat typing surface that is perpendicular a mounting surface;
- wherein said mounting surface mounts onto a surface adjacent an electrical outlet;
- wherein the cleat tying surface enables at least one electrical cord to be secured to said cleat;
- wherein said cleat prevents unwanted disconnection from or damage to said electrical outlet by said electrical cord;
- wherein said cleat includes a hinge located between the cleat tying surface and said mounting surface; wherein said hinge enables said cleat tying surface to fold flat against said mounting surface when not in use;
- wherein said cleat tying surface comprises a plurality of holes and a plurality of fingers; wherein said holes are positioned between said fingers and the adjacent surface;
- wherein said holes are not in communication with said fingers.

13. The electrical cord cleat as described in claim 12 wherein said mounting surface mounts to said adjacent surface via a mounting means comprising nails, screws, bolts and nuts, welding, adhesive, or rivets.

14. The electrical cord cleat as described in claim 12 wherein said cleat tying surface and said mounting surface are made of a material comprising a metal, plastic, wood, or carbon fiber composite.

15. The electrical cord cleat as described in claim 12 wherein at least one electrical cord is attached to the cleat tying surface via a half loop that is inserted through one of the holes and is wrapped around one of said fingers.

16. The electrical cord cleat as described in claim 12 wherein said hinge is a continuous hinge that runs an entire length between the cleat tying surface and the mounting surface.

* * * * *